(12) United States Patent
Wei

(10) Patent No.: US 9,203,717 B2
(45) Date of Patent: Dec. 1, 2015

(54) DETECTING NETWORK DEVICES

(71) Applicant: Google Inc., Mountain View, CA (US)

(72) Inventor: Wei Wei, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 125 days.

(21) Appl. No.: 14/134,192

(22) Filed: Dec. 19, 2013

(65) Prior Publication Data

US 2015/0180753 A1 Jun. 25, 2015

(51) Int. Cl.
*H04L 12/26* (2006.01)

(52) U.S. Cl.
CPC ........ *H04L 43/0823* (2013.01); *H04L 12/2644* (2013.01)

(58) Field of Classification Search
CPC .................. H04L 43/0823; H04L 12/2644
USPC .......................................................... 370/242
See application file for complete search history.

(56) References Cited

U.S. PATENT DOCUMENTS

| | | | |
|---|---|---|---|
| 6,252,888 | B1 | 6/2001 | Fite, Jr. et al. |
| 7,058,844 | B2 | 6/2006 | Wiley et al. |
| 7,284,181 | B1 | 10/2007 | Venkatramani |
| 7,606,144 | B2 | 10/2009 | Chen et al. |
| 7,613,183 | B1 | 11/2009 | Brewer et al. |
| 7,634,712 | B2 | 12/2009 | Bawankule et al. |
| 7,865,581 | B2 | 1/2011 | Straub et al. |
| 2004/0008631 | A1 | 1/2004 | Kim |
| 2004/0068689 | A1 | 4/2004 | Saxena |
| 2004/0243729 | A1 | 12/2004 | Milliken |
| 2006/0092827 | A1 | 5/2006 | Jain |
| 2006/0242493 | A1 | 10/2006 | Milliken |
| 2007/0280238 | A1 | 12/2007 | Lund |
| 2009/0138782 | A1 | 5/2009 | Ambilkar et al. |
| 2011/0149720 | A1 | 6/2011 | Phuah et al. |
| 2012/0100847 | A1 | 4/2012 | Rahman |

FOREIGN PATENT DOCUMENTS

| | | |
|---|---|---|
| EP | 1984834 B1 | 4/2012 |
| EP | 2651076 A1 | 10/2013 |

OTHER PUBLICATIONS

International Search Report and Written Opinion for Application No. PCT/US2014/069107 dated Feb. 17, 2015.

*Primary Examiner* — Sai-Ming Chan
(74) *Attorney, Agent, or Firm* — Honigman Miller Schwartz and Cohn LLP

(57) ABSTRACT

A method for detecting a network device that includes issuing a first command to a first network device and causing the first network device to generate error codes and send the generated error codes to a second network device. The first network device is in wired electrical communication with the second network device. The method includes receiving a number of error codes from the second network device. Moreover, the method includes determining a presence or absence of a third network device based on the number of error codes of the second network device. The third network device is in wired electrical communication between the first network device and the second network device. Communication between the first and second network devices passes through the third network device.

20 Claims, 7 Drawing Sheets

DETECTING NETWORK DEVICES

TECHNICAL FIELD

This disclosure relates to detecting network devices.

BACKGROUND

A basic communication system includes a transmitter that converts a message to an electrical form suitable to be transferred over a communication channel. The communication channel transfers the message from the transmitter to the receiver. The receiver receives the message and converts it back to its original form. A communication system that allows the user to access the internet and provide the user with television services may include an optical communication system, a cable communication system, or a satellite communication system. An optical communication system transmits pulses of light through an optical fiber. The light forms an electromagnetic carrier wave that is modulated to carry information. Another example of a communication system may be via a coaxial cable for transmitting radio frequency signals. Yet another communication method may be via satellites.

SUMMARY

One aspect of the disclosure provides a method for detecting a network device. The method includes issuing a first command to a first network device using a computer processor. The first network device is in wired electrical communication with a second network device. The first command causes the first network device to generate error codes. Moreover, the first command causes the first network device to send the generated error codes to the second network device. The method includes receiving a number of error codes from the second network device and determining a presence or absence of a third network device. The third network device is in wired electrical communication between the first network device and the second network device, and communication between the first and second network devices passes through the third network device. A third network device is present when the number of error codes received from the second network device equals zero, while the third network device is absent when the number of error codes of the second network device equals a number of generated error codes generated by the first network device.

Implementations of the disclosure may include one or more of the following features. In some implementations, the first command causes the first network device to generate packets including the error codes (e.g., a threshold number of packets having error codes). The error codes may be a cyclic redundancy check. The method may also include listening to the second network device for receipt of the generated packets having error codes.

In some examples, the method further includes issuing a clear command to the second device using the computer processor before issuing the first command. The clear command includes instructions to clear error codes of the second device. Additionally or alternatively, the method may further include receiving the number of error codes from the second network device after issuing the clear command, and the number of error codes equaling zero.

In some implementations, the wired electrical communication between the first, second, and third devices includes an Ethernet cable. The third device may be a hub, a switch, or a router. The first and second devices may be compatible with TR-069 protocol. In some examples, the method includes receiving the number of error codes from the second network device at a threshold time after issuing the first command.

Another aspect of the disclosure provides a system for detecting a network device. The system includes a first network device, a second network device and a controller. The second network device is in wired communication with the first network device, and the controller is in communication with the first and second network devices. The controller issues a first command to a first network device. The command causes the first network device to generate error codes and sends the generated error codes to the second network device. The controller receives a number of error codes from the second network device. The controller also determines a presence of a third network device when the number of error codes received from the second network device equals zero. The third network device is in wired electrical communication between the first network device and the second network device. Communication between the first and second network devices passes through the third network device. The controller further determines an absence of a third network device when the number of error codes of the second network device equals a number of generated error codes generated by the first network device.

In some implementations, the first command causes the first network device to generate packets including the error codes (e.g., a threshold number of packets having error codes). The error codes may be a cyclic redundancy check. The controller may listen to the second network device for receipt of the generated packets having error codes In some examples, the controller issues a clear command to the second device before issuing the first command to the first network device. The clear command includes instructions to clear error codes of the second device. Additionally or alternatively, the controller may receive the number of error codes from the second network device after the controller issues the clear command, and the number of error codes equals zero. In some examples, the system receives the number of error codes from the second network device at a threshold time after the system issues the first command.

In some implementations, the electrical communication between the first, second, and third devices includes an Ethernet cable. The third device may be a hub, a switch, or a router. The first and second devices may be compatible with TR-069 protocol.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
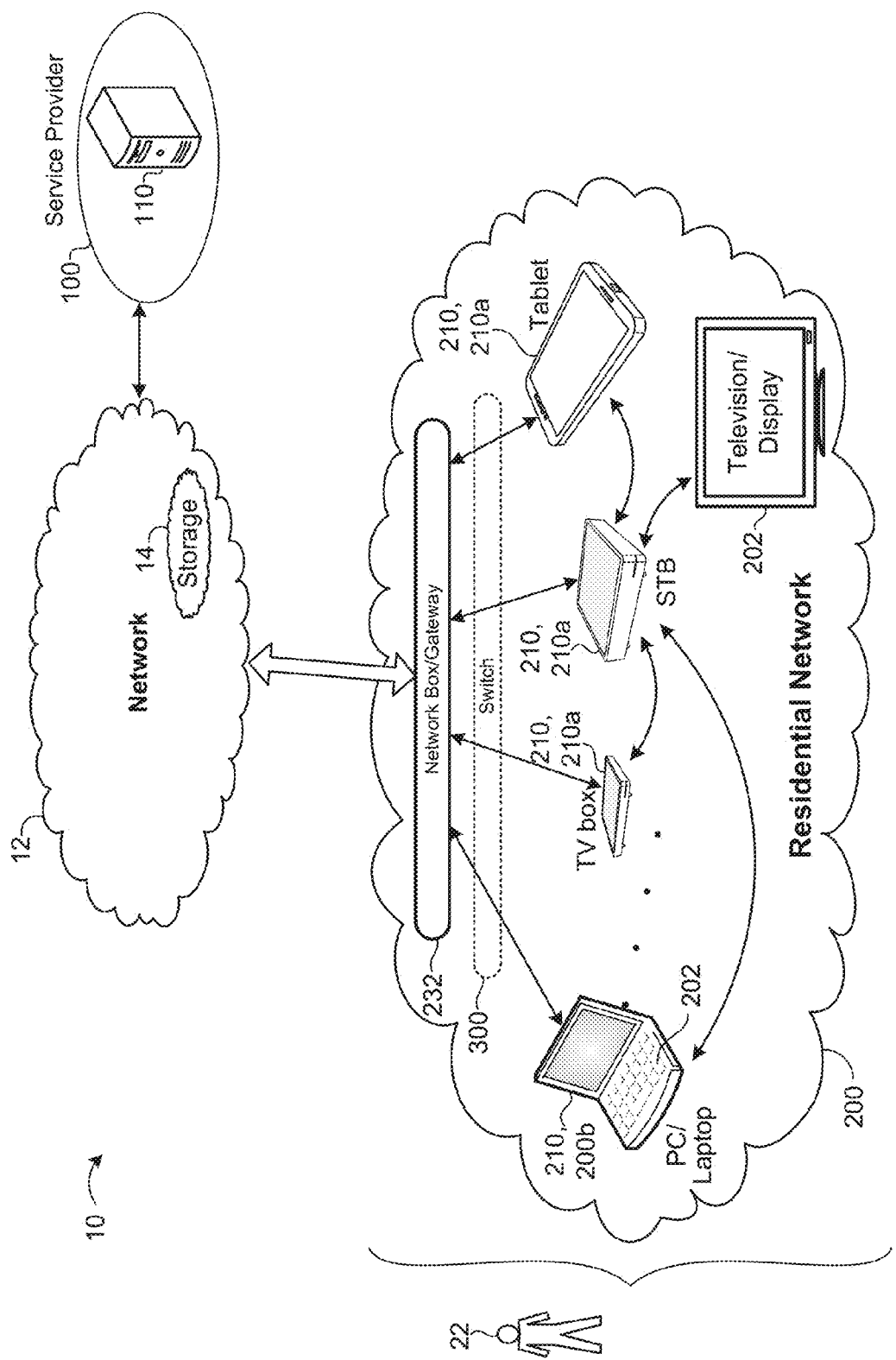
FIG. 1 is a schematic view of an exemplary architecture of a service provider network.
Figure 2A:
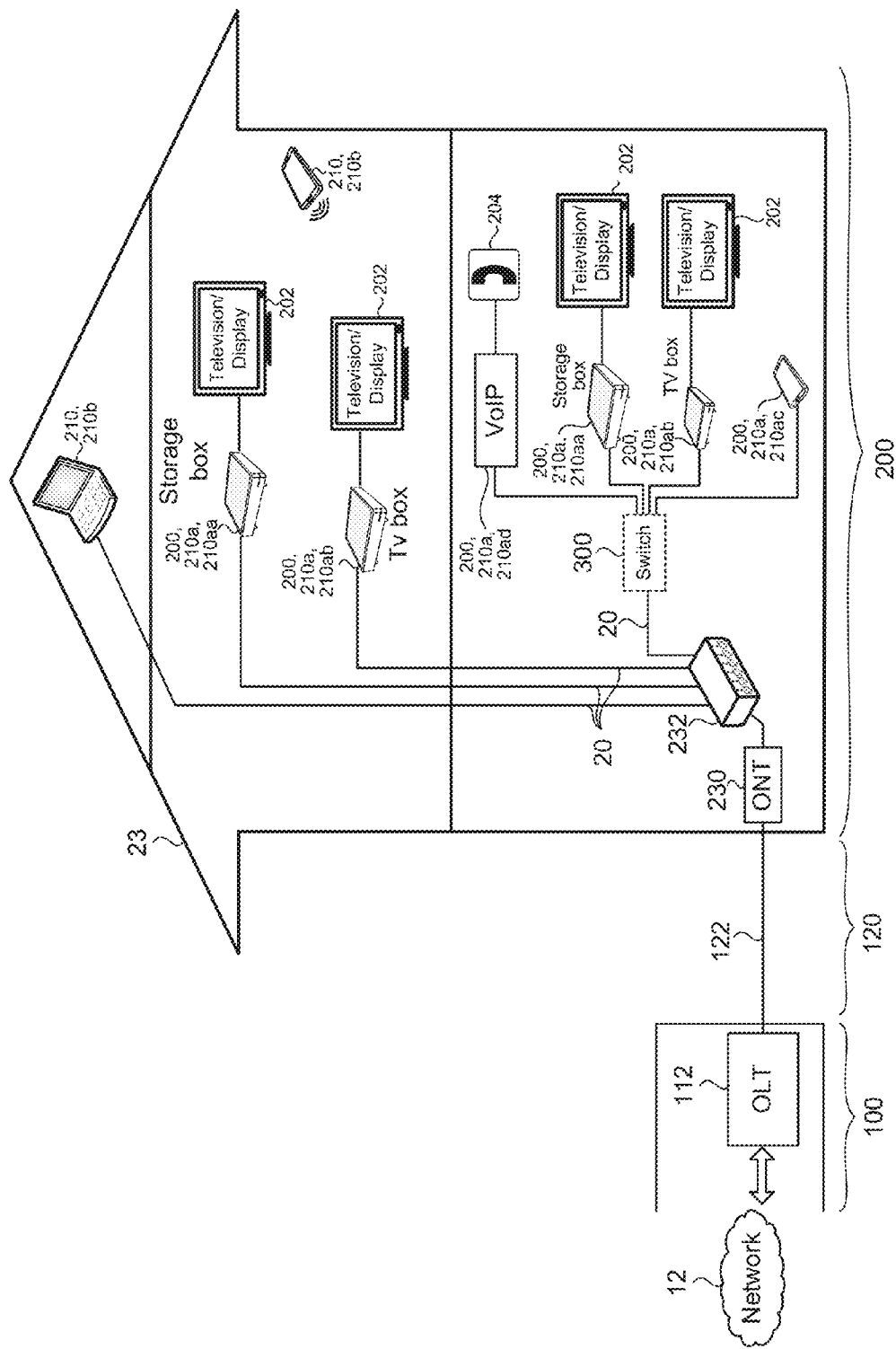
FIG. 2A is a schematic view of an overview of an exemplary home network.
Figure 2B:
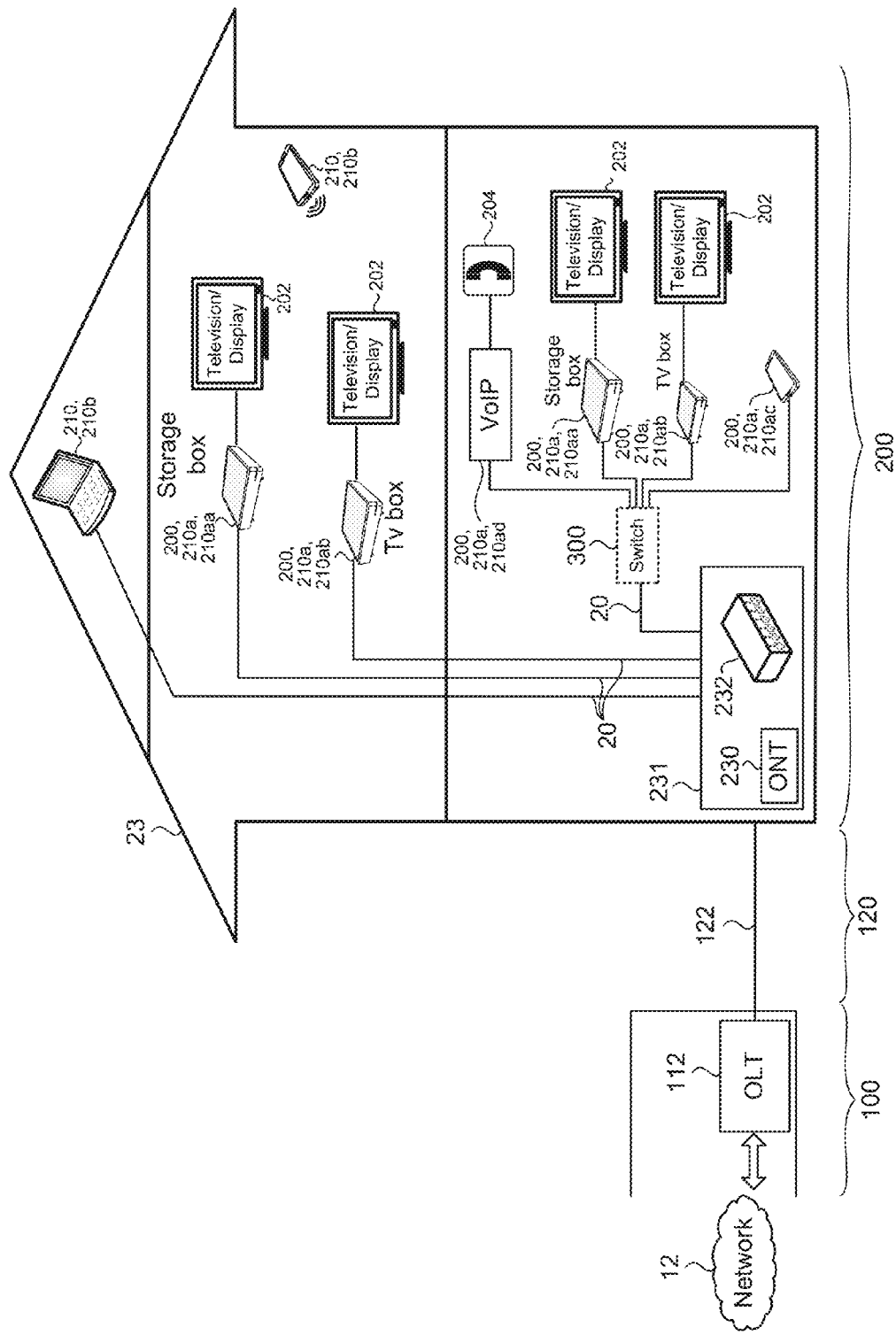
FIG. 2B is a schematic view of an overview of an exemplary home network.
Figure 2C:
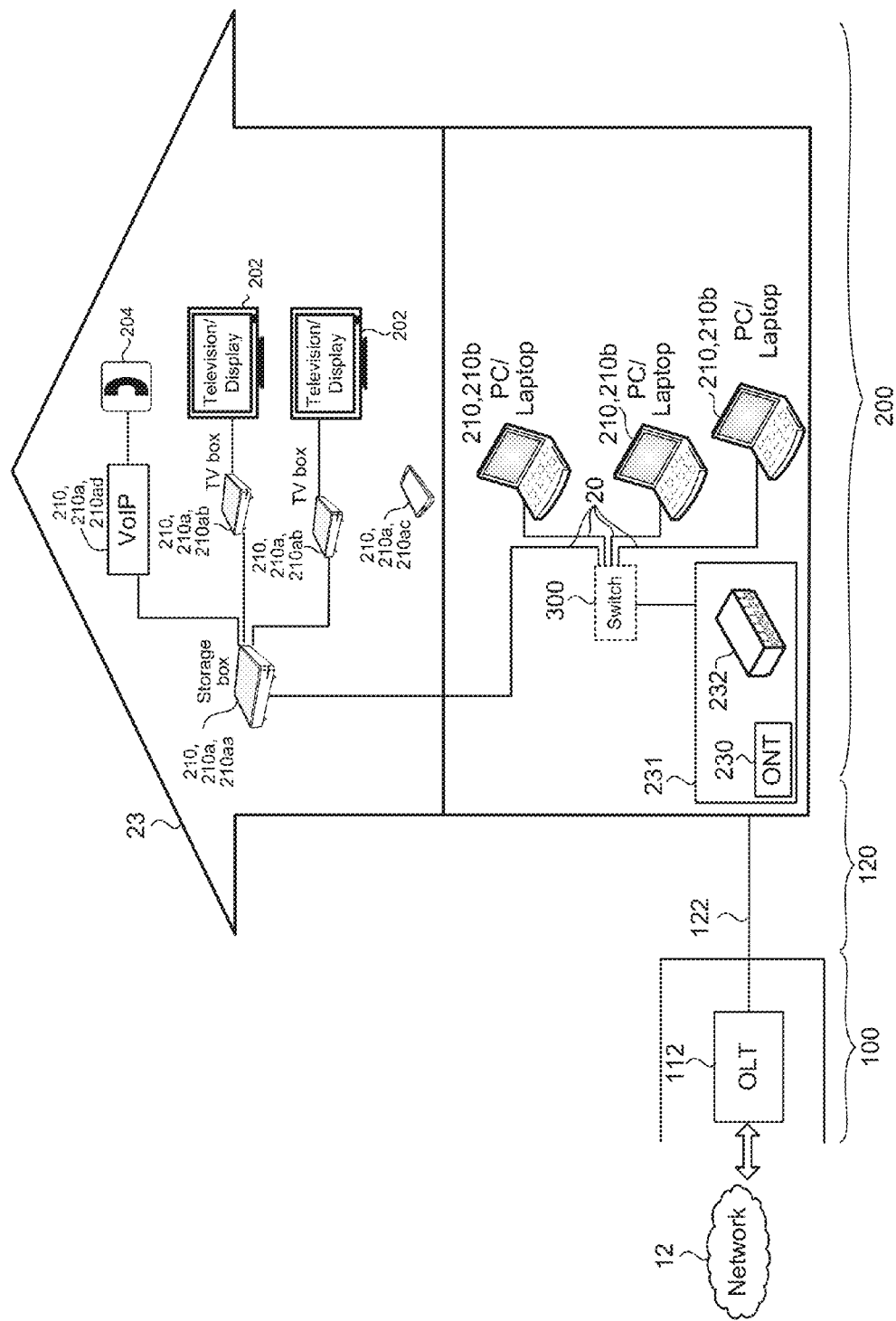
FIG. 2C is a schematic view of an overview of an exemplary home network.

Referring to FIGS. 1-2C, in some implementations, a system 10 distributes internet access and television services to subscribers or users 22. The system 10 transmits signals from a service provider 100 (e.g., a television and/or internet service provider) to a residential network 200 of a user 22 (e.g., via coaxial cables, fiber-optic cables, or satellite). The following will be described with reference to an optical communication architecture that provides a fiber-to-the-home (FTTH) network 12 establishing fiber-optic communications between a service provider 100 and a residential network 200 of an end-user 22. However, any type of communication including a coaxial cable communication or satellite communication or a combination thereof may be used to transmit the signals between the service provider 100 and the users 22.

Referring to FIG. 1, the service provider 100 may include an automatic configuration server or a network management server 110. The network management server 110 (e.g. a computer processor) manages certain electrical devices (e.g., customer provided equipment 210a). The residential network 200 includes electronic devices 210 connected to the network 12 via a residential gateway 232. In some examples, the residential network 200 includes electronic devices 210, such as, but not limited to, a laptop or personal computer, a television box, a set-top-box, a digital video recorder, a television, and/or a tablet. In some examples, one or more of the electronic devices 210 are connected to another one or more of the electronic devices 210. Moreover, in some examples, the network 12 includes network storage 14 that stores configurations related to the network management sever 110. The network management server 110 helps the service provider 100 in detecting devices 210 (e.g., switches 300) within the residential network 200 that are added by the user 22 and interrupt or impede the communications between devices 210 within the residential network 200.

The network 12 may include any type of network that allows sending and receiving communication signals (e.g., as a wireless telecommunication network, a cellular telephone network, a time division multiple access (TDMA) network, a code division multiple access (CDMA) network, a global system for mobile communications (GSM), a third generation (3G) network, a fourth generation (4G) network, a satellite communications network, and other communication networks). The network may include one or more of a Wide Area Network (WAN), a Local Area Network (LAN), and a Personal Area Network (PAN). In some examples, the network includes a combination of data networks and telecommunication networks.

An optical line termination 112 (OLT) may provide a service provider endpoint for a passive optical network 120 that includes optical fiber 122 connecting the service provider 100 to the end-user residential network 200. The optical line termination 112 converts electrical signals used by equipment of the service provider 100 to/from fiber-optic signals used by the passive optical network 120. The optical line termination 112 also coordinates multiplexing between conversion devices (e.g., optical network terminals).

An optical network terminal 230 (ONT) converts an optical signal received from the service provider 100 (over the passive optical network 120) into an electrical signal and provides Layer 2 media access control functions for the end-user residential network 200. The media access control (MAC) data communication protocol sub-layer, also known as the medium access control, is a sub-layer of the data link layer (Layer 2) specified in the seven-layer Open Systems Interconnection model (OSI model). Layer 1, the physical layer, defines electrical and physical specifications for devices. Layer 2, the data link layer, provides addressing and channel access control mechanisms, allowing several terminals or network nodes to communicate within a multiple access network incorporating a shared medium, e.g., Ethernet or coaxial cables.

A residential gateway (RG) or network box 232 of the residential network 200 provides Layer 3 network termination functions. The residential gateway 232 may be equipped with multiple Internet protocol (IP) interfaces. In some implementations, the optical network terminal 230 and the residential gateway 232 are integrated as a single optical network-residential gateway device 231 (as shown in FIG. 2B-C). The residential gateway 232 acts as an access point (e.g., wireless or wired connection) for the residential network 200, for example, by offering Wi-Fi connectivity to the residential network 200 or by offering multiple wired connections capable of establishing connections with electronic devices 210. Therefore, the network box 232 allows connection of the residential network 200 to the wide area network 12. Therefore, the network box 232 serves as a router to provide internet service to the devices 210 located within a limited area 23 (e.g., house, office building, etc.).

The residential network 200 is a local area network (LAN) (e.g., a home area network (HAN)) that facilitates communication and interoperability among electronic devices 210 within a limited area 23, such as a user's home, school, or office. An electronic device 210 may be a tablet, a smartphone, a personal computer or a laptop, a portable electronic device (e.g., cell phone, tablet computer, etc.), a smart television, a set-top-box, or a storage device, a voice-over-IP phone, each of which may be connected via Wi-Fi or have a wired connection to the network box 232. POTS (plain old telephone service) terminations (not shown) may also be provided by the optical network terminal 230 and/or the network box 232. The electronic devices 210 may be connected to the network box 232 through a wired connection 20, such as a coaxial interface, an RJ-45 interface, and/or a wireless interface, such as an RG-45 Ethernet interface for 802.11 Wi-Fi. A Wi-Fi connection may be slower than a wired connection; therefore, a user 22 may determine which devices 210 he/she wants to connect wirelessly verses the devices 210 he/she wants to connect via a wired connection. Such determination depends on the desired speed that the user 22 wants the device 210 to communicate with other devices 210 or the network 12. In some examples, the network box 232 includes Ethernet ports for connecting the electronic devices 210 to the network box 232 using an Ethernet cable. The network box 232 may have a predetermined number of output ports (e.g., 4 output ports) that support a wired connection. In some examples, a user 22 needs more than 4 output ports to connect his/her devices 210 and may connect a network device 300 capable of expanding the network 200.

Customer-premises equipment or customer provided equipment (CPE) 210a are electronic devices 210 associated with a service provider 100 (e.g., television or internet provider) as opposed to a user's electronic devices 200b. CPEs 210a are located at a user's premises 23 and are connected to the service providers' communication system through a demarcation point (also known as demarc). The demarcation point is a location in a user's building that separates the user's equipment from the equipment of the service provider(s), for example, the equipment in the distribution infrastructure or the central office (CO) of the service provider 100. CPEs 210a may include, but are not limited to, telephones, routers, switches, residential gateways 232, set-top boxes or storage box 210aa, home networking adaptors, and internet access gateways 232. CPEs 210a allow the user 22 to access the service provider's services and distribute them around the residence 23 through the residential network 200.

In some examples, the CPE 210a is a storage box, which connects to the network box 232 via a wire 20. Multiple storage boxes 210aa may be used per residence 23, allowing each user 22 to have full control over his/her management of the storage box 210aa. In other examples, one storage box 210aa is sufficient to accommodate a household and can record and store multiple programs (FIG. 2C). Therefore, a user 22 may store a program in one room and watch the program at a later time in any other room in the house. The storage box 210aa may simultaneously store different programs on different channels (e.g., 8). In addition to the television shows, the storage box 210aa may store media, such as home movies, music, and photos, which may all be accessed through the television.

In some examples, the CPE 210a is a television box or a set-top-box (STB) 210ab and allows a user 22 to watch television 202 or browse the internet using the television display 202. The television box 210ab allows a user 22 to watch television and access the internet through the user's television display 202. In some examples, each television box 210ab is capable of extending the Wi-Fi access point built in to provide better coverage throughout a user's house to reduce or eliminates dead spots. Therefore, the television box 210ab may be configured to turn every television 202 into a Wi-Fi router.

The user 22 may operate a remote control (e.g., a traditional remote control or an associated mobile device-based application) to control the television box or a set-top-box (STB) 210ab. The television box or a set-top-box (STB) 210ab may display a program guide on a display device (e.g., television 202 or projection screen). The user 22 may control what the television box or a set-top-box (STB) 210ab outputs to the television display 202 by selecting, via the program guide, what the user 22 wants to watch or listen to. Other features/operations that the user 22 may perform on the television box or a set-top-box (STB) 210ab include changing channels, browsing a program guide (e.g., searching for content), selecting a program from the program guide to watch, or setting a scheduled recording for a specific program. In some examples, the CPEs 210a include a tablet 210ac that is used as a remote control allowing the user 22 to control the storage box 210aa or the television box 210ab. The user 22 may select programs (e.g., shows, sitcoms, movies, and music channel) that are displayed on the televisions 202 connected to the storage boxes 210aa or the television box 210ab.

The CPEs may communicate via TR-069 protocol (Technical Report 069), which is a technical specification title CE WAN Management Protocol (CWMP) defining an application layer protocol for remote management of CPEs. TR-069 is a bidirectional SOAP/HTTP based protocol that provides direct communication between CPEs 210a and auto configuration servers (ACS) or a network management server (NMS) 110. TR-069 includes configuration and the ability to control CPE functions with an integrated framework. Other CPE communication protocols may be used, including but not limited to, Home Gateway Initiative (HGI), Digital Video Broadcasting (DVB), and WiMAX form.

The residential network 200 may include CPEs 210a and non-CPEs 210b. The residential network 200 connects to the external network 12 via the home gateway 232. The automatic configuration server or a network management server 110 may be at the service provider's network or external network 12. All TR-069 traffic passes through the home gateway 232 before reaching the CPEs 210a or before being sent to the network management server 110. A TR-069 session is initiated for every CPE 210a present within the residential network 200.

In some examples, a user 22 adds an added network device 300 to his/her residential network 200 to expand the network 200. A network device 300 may be a switch 300 (also known as a switching hub). The switch 300 is a device that links and/or expands network devices 210. The switch 300 may affect the behavior of the residential network 200, because it may not support the CPEs 210a provided by the service provider 100. A network switch 300 may include a multi-port network bridge that processes and routes data at the data link layer (Layer 2) of the OSI model. Some switches 300 may process data at the network layer (Layer 3) and above; these switches are referred to as multilayer switches. The added network device 300 may be a hub. A hub connects multiple Ethernet devices together and allows them to act as a single network segment. The hub includes multiple ports for input and output connections. The hub works at the physical layer (Layer 1) of the OSI model. The added network device 300 may be any device that a user 22 adds between two CPEs 210a, where the communication between the CPEs goes through the added network device 300. The added network device 300 is a device configured to detect and drop errors 222 included in received packets 220 before resending the packet 220 to another device 210.

In some implementations, a user 22 may complain that his/her residential network 200 is experiencing problems or the service provider 100 may detect that the residential network 200 is experiencing problems. The network management server 110 (e.g., a controller) is not capable of detecting the home network architecture and the connections between the CPEs 210a and the non-CPEs 210b to optimize the network 12. However, the network management server 110 is capable of reading information regarding the CPEs 210a and their interfaces, but it is not capable of detecting the interconnections of the CPEs 210a with other CPEs 210a or non-CPEs 210b.

In some implementations, a network device 300 (e.g., a third network device) may be in wired electrical communication between a first CPE 211 and a second CPE 212. Communication between the first and second CPEs 211, 212 passes through the network device 300 (if present). The network device 300 may receive data from the first CPE 211 and transmit the data to the second CPE 212. In some examples, the network device 300 is connected to multiple devices (e.g., CPEs 210a and non-CPEs 210b). The third network device 300 within the residential network 200 may be causing communication problems between the CPEs 210a, such as between the first and second CPEs 211, 212. The network management server 110 communicates with the first CPE 211 (e.g., a storage box 210aa, a television box 210ab, a portable electronic device 210ac, or a VoIP device 210ad connected to a telephone 204) and the second CPE 212 (e.g., a storage box 210aa, a television box 210ab, a portable electronic device 210ac, or a VoIP device 210ad connected to a telephone 204) to determine whether the communication problem is due to the presence of the third network device 300. The network management server 110 communicates with the first and second CPEs 211, 212 via the TR-069 protocol. The first and second CPEs 211, 212 each includes an error counter 211a, 212a for counting a number of errors.

Figure 3A:
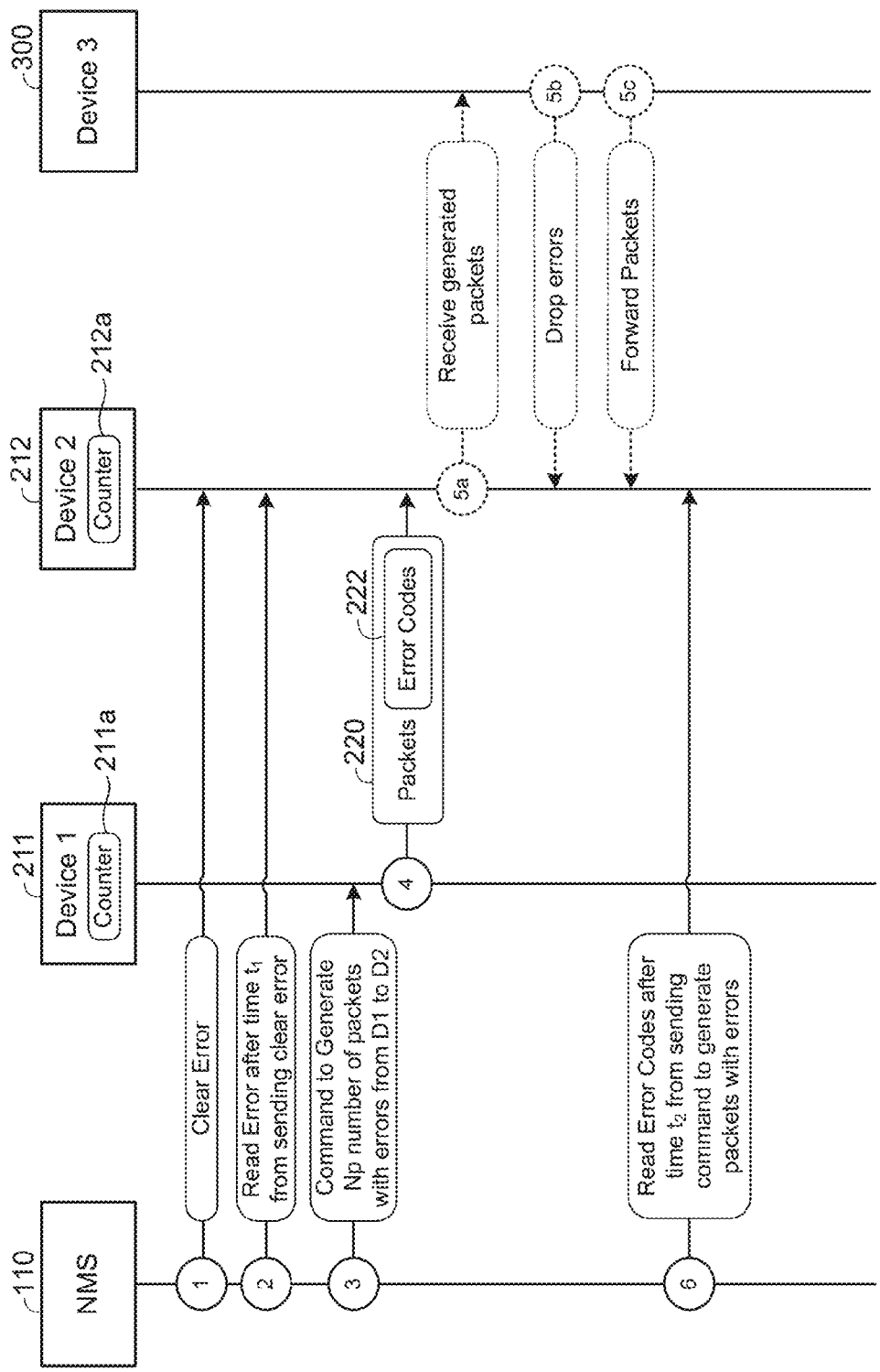
FIG. 3A is a schematic view of the communication between devices within the network in an exemplary system that detects a network device.
Figure 3B:
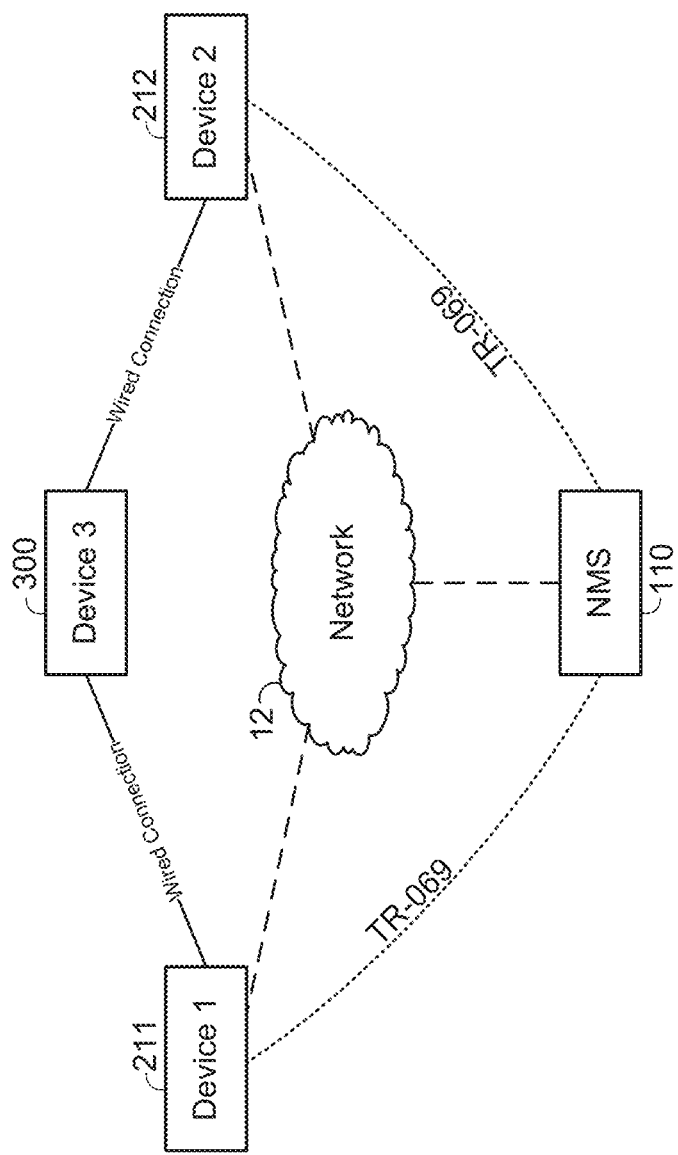
FIG. 3B is a schematic view of the protocols used in the communication between devices within the network in an exemplary system that detects a network device.

Referring to FIGS. 3A and 3B, the network management server 110 issues a clear command to the second CPE 212. The clear command includes instruction to clear error codes 222 of the second CPE 212. The network management server 110 waits for a first threshold time $t_1$ (e.g., 10 seconds), before reading the error codes 222 from the error counter 212a of the second CPE 212. If the network management server 110 reads more than a threshold number of error codes 222 (e.g., 5, 10, 15, 20 error codes) after the clear command, then the network management server 110 determines that there may be a problem in either the residential network 200 or the network 12 and therefore moves to other troubleshooting procedures. In some examples, the number of error codes 222 read equals zero indicating that there are no errors. Otherwise, the network management server 110 issues a first command to the first CPE 211, which causes the first CPE 211 to generate packets 220 that include error codes 222 and send the generated packets 220 (with the error codes 222) to the second CPE 212. The first command may include instruction to generate a specified number of packets Np (e.g., 10 packets, 20 packets). The network management server 110 waits a second threshold time $t_2$ (e.g., 1 second) and issues a command to read an error counter 212a on the second CPE 212. If the error counter 212a of the second CPE 212 increased by a number equal or greater than the specified number of packets Np, then the network management server 110 received the packets 220 with the error codes 222, i.e., the packets 220 were not modified from the first CPE 211 to the second CPE 212. However, if the error counter 212a of the second CPE 212 is less than the specified number of packets Np, then the network management server 110 received the packets 220 without the error codes 222; therefore, a third network device 300 (e.g., switch, router, or hub) is present and dropped the error codes 222 of each packet 220 sent from the first CPE 211. Therefore, contrary to the convention use of error codes 222, the detection of error codes 222 by the network management server 110, in the manner just described, actually means there is no error in the network 200.

In some implementations, the error detection used is a cyclic-redundancy-check (CRC). A CRC is an error-detection technique that detects errors in digital data networks and storage devices. CRC detects accidental changes in the raw data being transmitted. A certain number of check bits called a checksum are added to the message being transmitted. A device receiving the message determines whether the checksum agrees with the data to decide with a certain degree of probability if an error occurred during the transmission. CRC is based on polynomial arithmetic and on computing the remainder of dividing one polynomial in Galois field with two elements (GF(2)) by another polynomial. A Galois field polynomial is one in a single variable having a coefficient of 0 or 1. A device that is enabled for CRC (software or hardware) calculates the checksum for each block of data to be sent or stored and adds it to the data forming a code word. When another device receives or reads the code word, the device compares the checksum with a calculated checksum of a data block, or performs a CRC on the whole code word and compares the resulting checksum with an expected residue constant. If any discrepancy occurs then the data block includes errors. The receiving device may make corrections to the received data or may request the data to be resent from the sender device. As previously discussed, the added network device 300 is configured to drop error codes (e.g., CRC errors); therefore, when the second CPE 212 receives the data packet 220 originally sent from the first CPE 211, the second CPE 212 does not receive the error codes 222 (because the added device 300 dropped them). The CRC error detection is different than Link Layer Discovery protocol (LLDP) or other protocols, because they may not always detect an error 222 within a packet 220.

Figure 4:
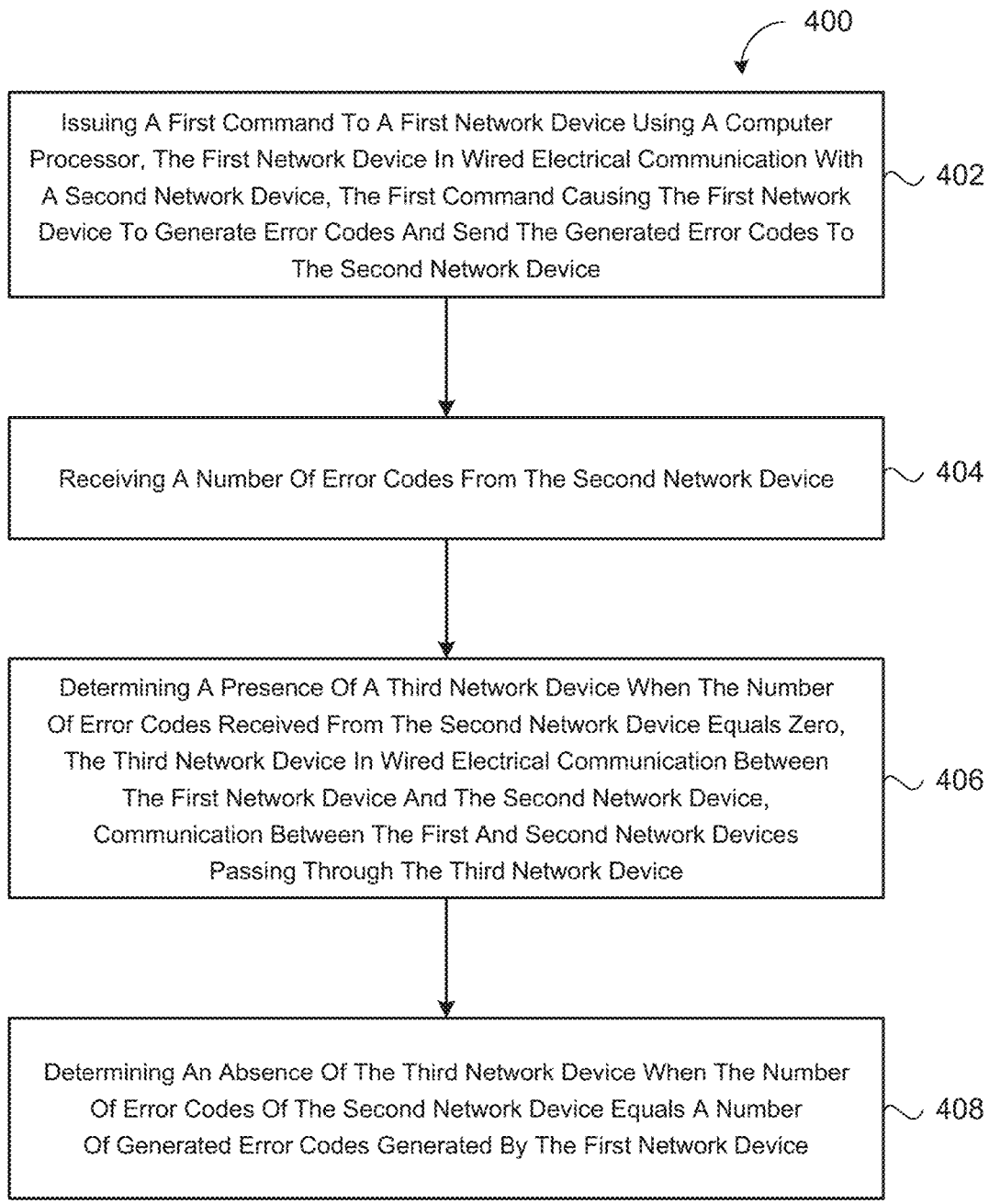
FIG. 4 is a schematic view of an exemplary arrangement of operations for communication between devices within the network in an exemplary system that detects a network device.

Referring to FIGS. 3A-4, a method 400 uses packets 220 with error codes 222 (e.g., CRC errors) as a probe to detect a network device 300. The method 400 includes issuing 402 a first command to a first network device 211 (e.g., a storage box 210aa, a television box 210ab, a portable electronic device 210ac, or a VoIP device 210ad connected to a telephone 204) using a computer processor 110 (e.g., network management server). The first network device 211 is in wired electrical communication with a second network device 212 (e.g., a storage box 210aa, a television box 210ab, a portable electronic device 210ac, or a VoIP device 210ad connected to a telephone 204). The first command causes the first network device 211 to generate error codes 222. Moreover, the first command causes the first network device 211 to send the generated error codes 222 to the second network device 212. The method 400 includes receiving 404 a number of error codes 222 from the second network device 212 and determining 406 a presence or absence of a third network device 300. The third network device 300 is in wired electrical communication between the first network device 211 and the second network device 212, and communication between the first and second network devices 211, 212 passes through the third network device 300. A third network device 300 is present when the number of error codes 222 received from the second network device 212 equals zero. The method 400 further includes determining 408 an absence of the third network device 300 when the number of error codes 222 of the second network device 212 equals a number of generated error codes 222 generated by the first network device 211.

In some implementations, the first command causes the first network device 211 to generate packets 220 that include the error codes 222. Additionally or alternatively, the first command may include generating a threshold number of packets 220 having error codes 222. The error codes 222 may be a cyclic redundancy check (as previously discussed). The method may include listening to the second network device 212 for receipt of the generated packets 220 having error codes 222.

In some examples, the method 400 further includes issuing a clear command to the second device 212 using the computer processor 110 before issuing the first command. The clear command includes instructions to clear error codes 222 from the error counter 212a of the second device 212. Additionally or alternatively, the method 400 may further include receiving the number of error codes 222 from the second network device 212 after issuing the clear command, where the number of error codes 222 equals zero.

In some implementations, the wired electrical communication 20 between the first, second, and third devices 211, 212, 300 includes an Ethernet cable. The third device 300 may be a hub, a switch, or a router. The first and second devices 211, 212 may be compatible with TR-069 protocol. In some examples, the method 400 includes receiving the number of error codes 222 from the second network device 212 at a threshold period of time $t_1$ after issuing the first command.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method (400) for detecting a network device (211, 212, 300), the method (400) comprising:
   issuing a first command to a first network device (211) using a computer processor (110), the first network device (211) in wired electrical communication (20) with a second network device (212), the first command causing the first network device (211) to generate error codes (222) and send the generated error codes (222) to the second network device (212);
   receiving a number of error codes (222) from the second network device (212);
   determining a presence of a third network device (300) when the number of error codes (222) received from the second network device (212) equals zero, the third network device (300) in wired electrical communication (20) between the first network device (211) and the second network device (212), communication between the first and second network devices (211, 212) passing through the third network device (300); and
   determining an absence of the third network device (300) when the number of error codes (222) of the second network device (212) equals a number of generated error codes (222) generated by the first network device (211).

2. The method (400) of claim 1, wherein the first command causes the first network device (211) to generate packets (220) comprising the error codes (222).

3. The method (400) of claim 2, wherein the error codes (222) are a cyclic redundancy check.

4. The method (400) of claim 1, further comprising listening to the second network device (212) for receipt of the generated packets (220) having error codes (222).

5. The method (400) of claim 1, further comprising before issuing the first command, issuing a clear command to the second network device (212) using the computer processor (110), the clear command comprising instructions to clear error codes (222) of the second network device (212).

6. The method (400) of claim 5, further comprising after issuing the clear command, receiving the number of error codes (222) from the second network device (212), the number of error codes (222) equaling zero.

7. The method (400) of claim 1, wherein the wired electrical communication (20) between the first, second, and third devices (211, 212, 300) comprises an Ethernet cable.

8. The method (400) of claim 1, wherein the third network device (300) is one of a hub, a switch (300), or a router.

9. The method (400) of claim 1, wherein the first and second network devices (211, 212) are compatible with TR-069 protocol.

10. The method (400) of claim 1, wherein receiving the number of error codes (222) from the second network device (212) is after a threshold time after issuing the first command.

11. A system (10) for detecting a network device, the system (10) comprising:
   a first network device (211);
   a second network device (212) in wired communication with the first network device (211); and
   a controller (110) in communication with the first and second network devices (211, 212), the controller (110):
      issuing a first command to a first network device (211), causing the first network device (211) to generate error codes (222) and send the generated error codes (222) to the second network device (212);
      receiving a number of error codes (222) from the second network device (212);
      determining a presence of a third network device (300) when the number of error codes (222) received from the second network device (212) equals zero, the third network device (300) in wired electrical communication (20) between the first network device (211) and the second network device (212), communication between the first and second network devices (211, 212) passing through the third network device (300); and
      determining an absence of the third network device (300) when the number of error codes (222) of the second network device (212) equals a number of generated error codes (222) generated by the first network device (211).

12. The system (10) of claim 11, wherein the first command causes the first network device (211) to generate packets (220) comprising the error codes (222).

13. The system (10) of claim 12, wherein the error codes (222) are a cyclic redundancy check.

14. The system (10) of claim 11, wherein the controller (110) listens to the second network device (212) for receipt of the generated packets (220) having error codes (222).

15. The system (10) of claim 11, wherein the controller (110) issues a clear command to the second network device (212) before issuing the first command to the first network device (211), the clear command comprising instructions to clear error codes (222) of the second network device (212).

16. The system (10) of claim 15, wherein the controller (110) receives the number of error codes (222) from the second network device (212) after the controller (110) issues the clear command, the number of error codes (222) equaling zero.

17. The system (10) of claim 11, wherein the wired electrical communication (20) between the first, second, and third devices (211, 212, 300) comprises an Ethernet cable.

18. The system (10) of claim 11, wherein the third network device (300) is one of a hub, a switch (300), or a router.

19. The system (10) of claim 11, wherein the first and second network devices (211, 212) are compatible with TR-069 protocol.

20. The system (10) of claim 11, wherein the system (10) receives the number of error codes (222) from the second network device (212) after a threshold time after the system (10) issues the first command.

\* \* \* \* \*